United States Patent [19]

Rehmer et al.

[11] Patent Number: 5,276,069
[45] Date of Patent: Jan. 4, 1994

[54] CONTACT ADHESIVES FOR SELF-ADHESIVE ARTICLES

[75] Inventors: Gerd Rehmer, Beindersheim; Gerhard Auchter, Bad Durkheim; Helmut Jaeger, Bobenheim, all of Fed. Rep. of Germany

[73] Assignee: BASF Aktiengesellschaft, Ludwigshafen, Fed. Rep. of Germany

[21] Appl. No.: 695,413

[22] Filed: May 3, 1991

[30] Foreign Application Priority Data

May 23, 1990 [DE] Fed. Rep. of Germany ....... 4016549

[51] Int. Cl.$^5$ .............. C08F 2/50; C08F 2/54; C08F 216/36; C08F 220/00
[52] U.S. Cl. .................... 522/35; 522/149; 522/182; 522/184; 522/904; 522/905; 525/328.6; 525/330.5
[58] Field of Search ............ 522/149, 904, 905, 182, 522/184, 35; 525/328.6, 330.5

[56] References Cited

U.S. PATENT DOCUMENTS

| | | | |
|---|---|---|---|
| 3,574,617 | 4/1971 | Skoutchi | 522/905 |
| 4,148,987 | 4/1979 | Winey | 522/905 |
| 4,304,705 | 12/1981 | Heilmann et al. | 522/149 |
| 4,737,559 | 4/1988 | Keller et al. | 522/905 |

*Primary Examiner*—Susan Berman
*Attorney, Agent, or Firm*—Oblon, Spivak, McClelland, Maier & Neustadt

[57] ABSTRACT

Synthetic resins are obtainable by chemically bonding one or more compounds of the general formula I

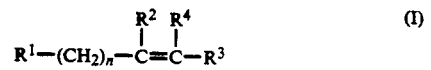

where $R^1$ is —OH, —NH$_2$,

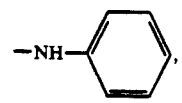

—NHR$^3$ or

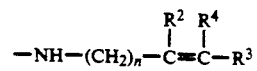

$R^2$ is —H, —CH$_3$ or —C$_2$H$_5$, $R^3$ is —C$_m$H$_{2m+1}$, where m is from 1 to 6, $R^4$ is —H or —CH$_3$ and n is from 1 to 12, via the oxygen or nitrogen atom of $R^1$ to one or more polymers A which consist of
 a) from 50 to 100% by weight of one or more esters of acrylic or methacrylic acid with monohydric alcohols of 1 to 18 carbon atoms or a mixture of these esters (monomers a) and
 b) from 0 to 50% by weight of other copolymerizable monomers (monomers b) in polymerized form, in amounts such that the synthetic resin contains from 0.01 to 1 mole of double bonds per kg of polymer A.

After exposure to ultraviolet light or to electrons, these synthetic resins are suitable as contact adhesives.

13 Claims, No Drawings

CONTACT ADHESIVES FOR SELF-ADHESIVE ARTICLES

The present invention relates to synthetic resins obtainable by chemically bonding one or more compounds of the general formula I

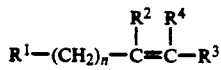

where
$R^1$ is —OH, —$NH_2$,

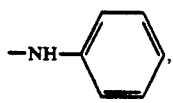

—$NHR^3$ or

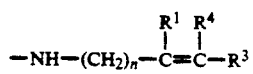

$R^2$ is —H, —$CH_3$ or —$C_2H_5$, $R^3$ is —$C_mH_{2m+1}$, where m is from 1 to 6, $R^4$ is —H or —$CH_3$ and n is from 1 to 12, via the oxygen or nitrogen atom of $R^1$ to one or more polymers A which consist of
a) from 50 to 100% by weight of one or more esters of acrylic or methacrylic acid with monohydric alcohols of 1 to 18 carbon atoms or a mixture of these esters (monomers a) and
b) from 0 to 50% by weight of other Copolymerizable monomers (monomers b) in polymerized form,
in amounts such that the synthetic resin contains from 0.01 to 1 mole of double bonds per kg of polymer A.

The present invention furthermore relates to the preparation of these synthetic resins and their use, after exposure to electrons or ultraviolet light, as contact adhesives for self-adhesive articles.

Contact adhesives possess permanent tack, permitting the production of self-adhesive articles. The requirements which the contact adhesion has to meet are determined by the particular application. For example, a contact adhesive suitable in particular for the production of self-adhesive tapes or self-adhesive labels is expected
a) to adhere after brief and gentle contact to the surface of the substrate to which it is to be bonded, i.e. to have high surface tack,
b) to exhibit good adhesion to the substrate to which it is to be bonded and
c) to have high cohesion.

DE-A 36 13 082 discloses polyesters which carry acrylyl or methacrylyl groups and which are recommended as contact adhesives after exposure to electrons or ultraviolet light.

However, the disadvantage of these contact adhesives is that they are not simultaneously completely satisfactory with regard to surface tack, adhesion and cohesion.

It is an object of the present invention to provide synthetic resins which are based on polymers carrying unsaturated groups and, after exposure to electrons or ultraviolet light, are suitable as contact adhesives with simultaneously high surface tack, adhesion and cohesion, in particular for the production of self-adhesive tapes or self-adhesive labels.

We have found that this object is achieved by the synthetic resins defined at the outset.

Monomers a of particular interest are the esters of acrylic and methacrylic acid with alkanols of 1 to 12 carbon atoms, such as methanol, ethanol, n-butanol, isobutanol, tert-butanol, 3-methylbutan-1-ol (isoamyl alcohol), n-pentanol, n-heptanol, 2-ethylhexan-1-ol, n-octanol and isooctanol. The esters of acrylic and methacrylic acid with cyclic monohydric alcohols, such as cyclohexanol, tert-butylcyclohexanol, tetrahydrofurfuryl alcohol or isoborneol, are also suitable monomers a. The polymer A preferably contains more than 50% by weight, based on the total amount of monomers a polymerized in polymer A, of polymerized units of esters of acrylic and methacrylic acid with nontertiary alkanols of more than three carbon atoms. The acrylates and methacrylates of n-butanol and of 2-ethylhexan-1-ol are particularly preferred. Polymer A preferably contains polymerized units of the esters of acrylic and methacrylic acid with methanol as the acrylate and methacrylate of an alkanol of less than 3 carbon atoms.

Novel synthetic resins which, after exposure to ultraviolet light, can advantageously be used as contact adhesives contain, as one or more monomers b, one or more monoethylenically unsaturated acetophenone or benzophenone derivatives which do not have a phenyl group containing a free hydroxyl group ortho to the carbonyl group of the phenone skeleton, or mixtures of such acetophenone and benzophenone derivatives, as polymerized units (monomers b1). Suitable monomers b1 include compounds of the general formula II

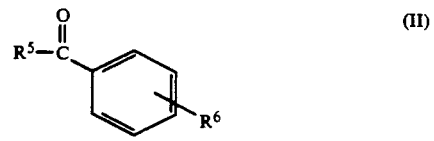

where $R^5$ is —$CH_3$ or —$C_6H_5$ and $R^6$ is

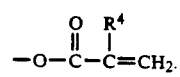

Preferred compounds II in which $R^5$ is phenyl and $R^6$ is para to the carbonyl group of the phenone skeleton.

Other suitable monomers b1 are compounds of the general formula III

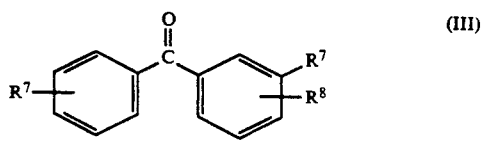

where $R^7$ is —H or —$C_nH_{2n+1}$, where n is from 1 to 4, $R^8$ is —O—$R^9$ or

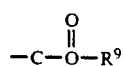

and $R^9$ is

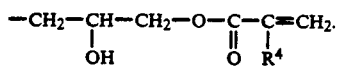

Preferably used compounds III are those in which $R^8$ is an ester group and is para to the carbonyl group of the phenone skeleton. Further suitable monomers b1 are compounds of the general formula IV

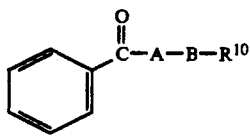

and compounds of the general formula V

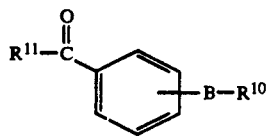

where
$R^{10}$ is

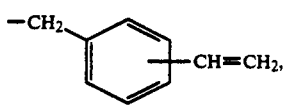

$R^{11}$ is $-C_nH_{2n+1}$, where n is from 1 to 3, or $-C_6H_5$,
A is a saturated or unsaturated hydrocarbon chain which may be branched and is of 1 to 3 carbon atoms, or a hydrocarbon ring of 3 to 6 carbon atoms,
B is $-O-$,

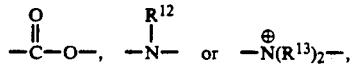

$R^{12}$ is $-H$ or $-C_nH_{2n+1}$, where n is from 1 to 8, and
$R^{13}$ is $-C_nH_{2n+1}$, where n is from 1 to 4.

Other suitable monomers b1 are compounds of the general formula VI

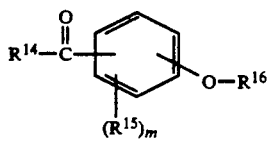

where
$R^{14}$ lower alkyl or phenyl, where the hydrogen atoms of the phenyl group may be monosubstituted or polysubstituted by halogen, lower alkoxy or hydroxyl, with the proviso that a phenyl hydrogen ortho to the carbonyl group of the phenone skeleton is not replaced by a hydroxyl group,
$R^{15}$ is halogen, lower alkoxy and/or hydroxyl, with the proviso that, in the case of hydroxyl, $R^{15}$ is not ortho to the carbonyl group of the phenone skeleton,
m is from 0 to 4,
D is $-O-$,

an oxyalkyleneoxy chain, a carbamoylalkyleneoxy chain or an alkyleneoxy chain and
$R^{16}$ is alkenyl or ψ-carboxyalkenyl.

Other advantageously incorporated monomers b1 are compounds of the general formula VII

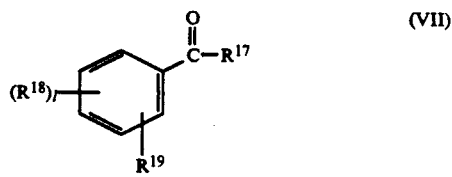

where
$R^{17}$ is $R^{11}$ or phenyl in which some or all of the l hydrogen atoms may be replaced by $R^{18}$,
l is from 0 to 4,
$R^{18}$ is $-H$, $-CF_3$, $-O-$alkyl and/or alkyl$-COO-$, where alkyl in each case is from 1 to 4 carbon atoms, halogen, $-CN$, $-COOH$ or a $-OH$ group which is not ortho to the carbonyl group of the phenone skeleton,
$R^{19}$ is a group of the general formula VIII

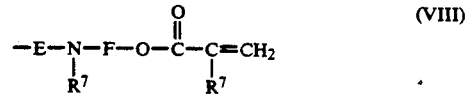

where
E is

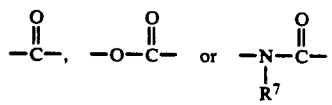

and
F is a hydrocarbon chain of 2 to 12 carbon atoms which may be interrupted by one or more oxygen atoms. Preferred compounds VII are the acrylate and methacrylate of the alcohol of the following structure

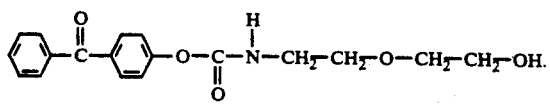

Particularly preferred monomers b1, however, are compounds of the general formula IX

where
$R^{20}$ is straight-chain alkyl of from 1 to 3 carbon atoms, alkyl of 3 or 4 carbon atoms whose hydrogen atoms may be replaced by one or more halogen atoms, aryl or $R^{21}$,
$R^{21}$ is

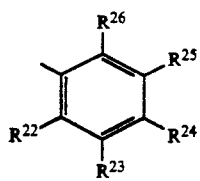

$R^{22}$ to $R^{25}$ independently of one another are each $R^7$, —OH (which must not be ortho to the carbonyl group of the phenone skeleton ), —OCH$_3$, —OC$_2$H$_5$, —SH, —SCH$_3$, —Cl, —F, —CN, —COOH, —COO—alkyl where alkyl is of 1 to 3 carbon atoms, —CF$_3$, —N(CH$_3$)$_2$, —N(C$_2$H$_5$)$_2$, —N(CH$_3$)C$_6$H$_5$, —N⊕(CH$_3$)$_3$X⁻, —N⊕(CH$_3$)$_2$X⁻ where X⁻ is an anion, such as Cl⁻, Br⁻, CH$_3$COO⁻, HSO$_4$⁻, H$_2$PO$_4$⁻ or NO$_3$⁻, with the proviso that one or more of the radicals $R^{22}$ to $R^{26}$ are a radical of the general formula X

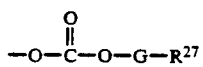       (X)

where
$R^{27}$ is

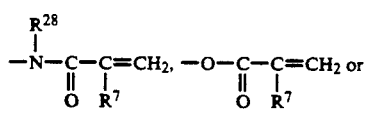

$R^{28}$ is $R^5$ or $R^7$,
G is

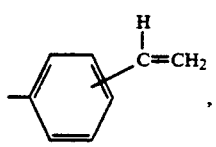

K is alkylene whose hydrogen atoms may be mono- or polysubstituted by halogen atoms, or is cycloalkylene of 5 to 10 carbon atoms or phenylene,
J is —O—, —S—,

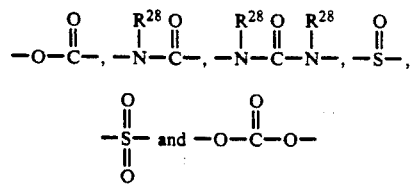

i and k are each from 1 to 10 and
j and h are each from 0 to 25,
and, among the compounds IX, the monomers

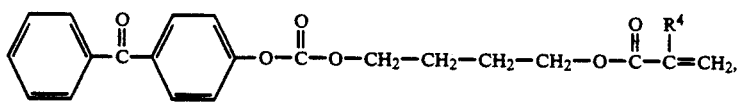

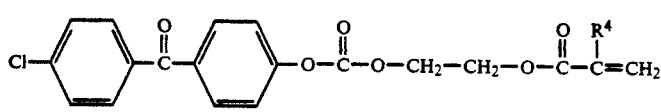

and

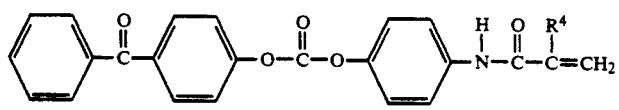

are preferred.

Other suitable monomers b1 are compounds of the general formula XI

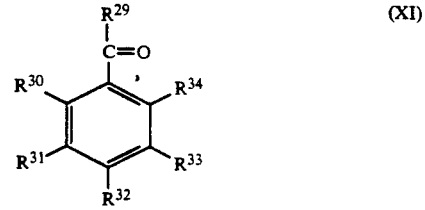       (XI)

where
$R^{29}$ is alkyl of 1 to 4 carbon atoms, cyclopropyl, cyclopentyl, cyclohexyl, phenyl or phenyl in which some or all of the hydrogen atoms have been replaced by $R^{32}$, not more than two substituents $R^{32}$ being identical, and $R^{29}$ together with $R^{30}$ or together with $R^{34}$ forms a —CH$_2$—CH$_2$—or —CH$_2$—CH$_2$—CH$_2$—bridge,
$R^{32}$ is alkyl of 1 to 24 carbon atoms,

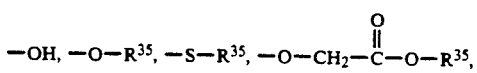

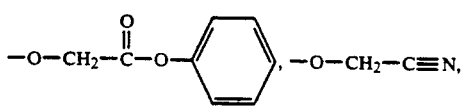

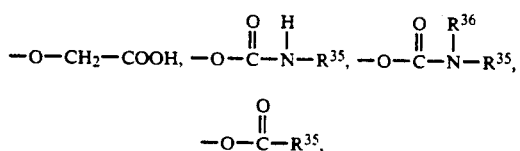

$R^{30}$ or $R^{34}$, where $R^{29}$ is aryl, is a direct bond to $R^{30}$ ortho to the carbonyl group, or independently of one another are both one of the radicals $R^{32}$, and $R^{31}$ and $R^{33}$ are each one of the radicals $R^{32}$ or a group of the general formula XII

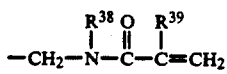
(XII)

where $R^{35}$ and $R^{36}$ are each alkyl of 1 to 4 carbon atoms, $R^{37}$ is cycloalkyl of 5 or 6 carbon atoms and $R^{38}$ and R are each hydrogen or alkyl of 1 to 4 carbon atoms, with the proviso that either $R^{31}$ or $R^{33}$ is a group of the general formula XII.

The compounds of the general formulae II to VII and of the general formula IX are known and are described in, for example, U.S. Pat. No. 3 214 492 (compounds II), U.S. Pat. No. 3 429 852 (compounds III), DE-A 28 18 763 (compounds IV and V), EP-A 246 848 (compounds VI) in the prior publication P 38 20 463.0 (compounds VII) and in the prior publication P 3844444.5 (compound IX).

The monomers b1 of the general formula XI are as a rule obtainable in a simple manner by reacting a compound of the general formula XIII

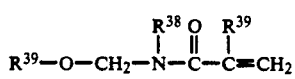
(XIII)

with a compound of the general formula XIV

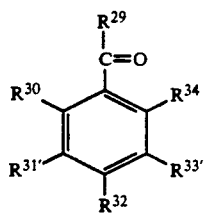
(XIV)

where $R^{31'}$ or $R^{33'}$ is hydrogen and the other radical is $R^{32}$.

The reaction is carried out in accordance with the general reaction scheme XV

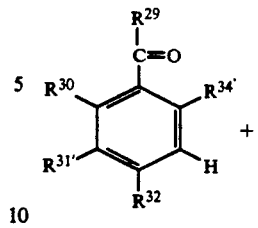
(XV)

This type of reaction is known in the literature as amidomethylation, and the associated reaction conditions have already been described in, inter alia, the following sources:

H. Hellmann, G. Archinger and P. Wiedemann, J. Liebigs Ann. Chemie 626, (1959), page 35

H. E. Zang and W. B. Martin, Organic Reactions 14 (1965), 52

H. E. Zang, Synthesis (1970), 49.

As a rule, the compounds XIII and XIV are used in equimolar amounts. A detailed description of the compounds XI and their preparation appears in, inter alia, the prior publication P 4 007 318.1.

The novel synthethic resins preferably contain from 0.05 to 5, particularly preferably from 0.25 to 2%, by weight, based on polymer A, of the monomers b1 as polymerized units, the following compounds being very particularly preferred within the stated total amount of the monomers b1:

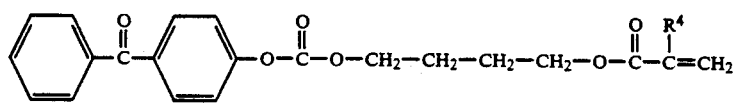

and

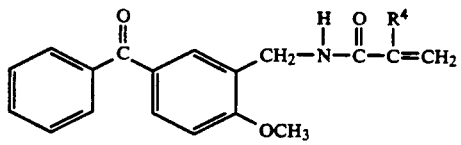

The novel synthetic resins which only meet the requirement of being advantageous contact adhesives after exposure to electrons do not necessarily contain monomer b1 as polymerized units in A.

The group of monomers b preferably includes monoethylenically unsaturated monobasic or dibasic acids of 3 to 6 carbon atoms (monomers b2). Examples of these are sulfonic acids, such as vinylsulfonic acid or 2-acrylamido-2-methylpropanesulfonic acid, and phosphonic acids, such as vinylphosphonic acid. However, mono and/or dicarboxylic acids are preferably polymerized as monomers b2. Examples of these are acrylic acid, methacrylic acid, maleic acid, fumaric acid and itaconic acid. Other suitable monomers b2 are the monoesters of these monoethylenically unsaturated dicarboxylic acids with alkanols of 1 to 7 carbon atoms, and the corresponding semiamides with aliphatic amines of 1 to 7 carbon atoms. The polymers A preferably contain from 0.05 to 6%, particularly preferably from 0.1 to 4%, by weight of monomers b2 as polymerized units. The presence of the monomers b2 has a particularly advantageous effect on the adhesion and cohesion of the novel contact adhesives.

The novel synthetic resins can be prepared in a remarkably simple manner if the polymers A contain, as polymerized units, cyclic anhydrides of monoethylenically unsaturated dicarboxylic acids of 4 to 8 carbon atoms, such as maleic anhydride or itaconic anhydride (monomers b3). As a rule, the preparation process in these cases is restricted to a procedure in which the compounds I, in particular compounds I containing amine functions, are stirred into a solution of the polymers A, in general to give synthetic resins which possess high heat stability of the chemical bond of the compounds I to the polymer A. The polymerization of maleic anhydride is particularly advantageous. The polymers A preferably contain from 0.1 to 10, particularly preferably from 1 to 5, % by weight of monomers b3 as polymerized units.

Other suitable monomers b are vinyl esters of aliphatic carboxylic acids of 2 to 18 carbon atoms, such as vinyl acetate, vinyl propionate, vinyl laurate and vinyl stearate, vinylaromatic compounds, such as styrene, α-methylstyrene or vinyltoluene, unsaturated hydrocarbons, such as ethene, cyclohexene, butadiene or isoprene, nitrogen-containing monomers, such as acrylamide, N-vinylpyrrolidone or N-vinylcaprolactam, vinyl ethers, such as methyl vinyl ether, ethyl vinyl ether, n-butyl vinyl ether, isobutyl vinyl ether, 2-ethylhexyl vinyl ether or 2-methylene-1,3-dioxepan, halogen-containing monomers, such as vinyl chloride or vinylidene chloride, diesters of lower monoethylenically unsaturated carboxylic acids with alkanols of 1 to 10 carbon atoms, such as di-n-butyl fumarate, diethyl maleate or dimethyl fumarate, and the esters of acrylic or methacrylic acid with glycidol.

The total amounts of the monomers constituting the polymer A are preferably chosen so that the glass transition temperature of the polymer A is from $-40°$ to $0°$ C., preferably from $-30°$ to $-10°$ C. According to Fox (T. G. Fox, Bull. Am. Phys. Soc. (Ser. II) 1 (1956), 123), the following is a good approximation for the glass transition temperature of copolymers:

$$\frac{1}{T_g} = \frac{x^1}{T_g^1} + \frac{x^2}{T_g^2} + \ldots \frac{x^s}{T_g^s}$$

where $x^1, x^2, \ldots, x^s$ are the mass fractions of the monomers $1, 2, \ldots,$ and $T_g^1, T_g^2, \ldots, T_g^s$ are the glass transition temperatures, in degrees Kelvin, of the particular polymers composed only of one of the monomers $1, 2, \ldots$ or s. The glass transition temperatures of the stated monomers a and b are essentially known and are stated in, for example, J. Brandrup and E. H. Immergut, Polymer Handbook 1st Ed. J. Wiley, New York 1966 and 2nd Ed. J. Wiley, New York 1975.

Preferred compounds of the general formula I are those which contain an amine function. Examples of these are allylamine, N-methylallylamine, diallylamine, methallylamine, N-ethylmethallylamine, N-(2-methylallyl)ethylamine or N-phenylallylamine. Allylamine is particularly preferably used. A preferred compound I having a hydroxyl function is allyl alcohol. The novel synthetic resins advantageously contain from 0.01 to 0.5, preferably from 0.01 to 0.25, mole of double bonds per kg of polymer A, in the form of one or more compounds I. Particularly advantageous in terms of performance characteristics are novel synthetic resins whose polymers A on the one hand contain monomers b3 as polymerized units and on the other hand are chemically bonded with one or more compounds I via the oxygen or nitrogen atom of their radical $R^1$ in amounts such that, on the one hand, the number of moles of the chemically bonded compounds I is not less than one tenth of the number of moles of the polymerized monomers b3 and, on the other hand, the number of moles of double bonds per kg of polymer A is from 0.01 to 0.5, preferably from 0.01 to 0.25, the polymers A containing from 0.1 to 10, particularly preferably from 1 to 5%, by weight, based on the total amount of the polymerized monomers a and b, of monomers b3 as polymerized units. A measure of the amount of compounds I chemically bonded in the novel synthetic resins is their hydrogenation iodine number (HIN) determined according to DIN 53,241. It is defined as the amount of iodine in grams which is equivalent to the amount of hydrogen which is chemically bonded according to DIN 53,241 by 100 g of synthetic resin.

The preparation of the novel synthetic resins is advantageously carried out in two stages. In the first stage, the one or more polymers A are prepared in a conventional manner by free radical polymerization of the monomers a and b, preferably in solution, and said polymers A are then reacted with the compounds I.

Suitable polymerization initiators for the free radical solution polymerization include hydroperoxides, such as cumene hydroperoxide or tert-butyl hydroperoxide, dialkyl peroxides, such as dicumyl peroxide or di-tert-butyl peroxide, and azo compounds, such as 2,2'-azobisisobutyronitrile, 2,2'-azobis-(methyl isobutyrate) or 2,2'-azobis-(2,4-dimethylvaleronitrile). The polymerization initiators are used, as a rule, in amounts of from 0.1 to 10% by weight, based on the total amount of the monomers to be polymerized. In the solution polymerization, it is also possible concomitantly to use molecular weight regulators, for example mercaptans, such as mercaptosuccinic acid or mercaptoethanol, or compounds such as bromoform or carbon tetrachloride. Suitable solvents include ethyl acetate, n-butyl acetate, acetone, methyl ethyl ketone, toluene, benzene, xylene, tetrahydrofuran, gasolines and cyclohexane. The boiling point of the solvent is preferably from $50°$ to $1500°$ C. The polymerization temperature is in general from $20°$ to $150°$ C., preferably from $60°$ to $900°$ C. The solution polymerization can be carried out both as a batch process and in the form of a feed process. The feed process, in which some of the polymerization batch is initially taken and heated to the polymerization temperature and the remainder is then fed in continuously, if necessary in separate feeds, is preferred. In a particularly preferred variant of the feed process, the initially taken mixture contains none or only some of the monomers b3 to be polymerized. The residual amount of monomers b3 is dissolved in some of the remaining monomers or in some of the solvent and is introduced into the initially taken mixture via a separate feed, at the same time or more rapidly than the other remaining monomers. The polymers A usually have a K value of from 20 to 70, preferably from 30 to 50, at 25° C. in tetrahydrofuran (THF). The K value is a relative viscosity number which is determined similarly to DIN 53,726. The flow rate of a 1% strength by weight solution of the polymer A in THF, relative to the flow rate of pure THF, is measured. It characterizes the mean degree of polymerization of the polymer.

The reaction of the polymers A with the compounds I is advantageously carried out by a procedure in which the compounds I, preferably in solution, are stirred into the polymers A, preferably likewise in solution, at from 20° to 150° C. and, if required, at up to 100 bar, and the stirred reaction mixture is left for some time. As a rule, the usual exothermic reaction is complete after a few hours. The agents which are also suitable for the solution polymerization can usually be used as solvents.

By adding catalytic amounts of protic acids, such as sulfuric acid, acetic acid or phosphoric acid, the reaction of the polymers A with the compounds I can be accelerated. The one or more polymers A and the one or more compounds I are, as a rule, used in stoichiometric amounts.

An important precondition for the novel reaction of the polymers A with the compounds I is, however, that the reaction medium contains no residual amounts of polymerization initiators remaining from the preparation of the polymers A. After the free radical polymerization carried out for the preparation of the polymers A, these residual initiators are therefore advantageously removed. This can be done in a conventional manner, for example by postpolymerization, if necessary at elevated temperatures and high pressure, or by the addition of suitable chemical agents, for example reducing agents, such as ascorbic acid, where peroxides are used as initiators. If the polymers A contain monomers b3 as polymerized units, the compounds I are preferably used in less than a stoichiometric amount, based on the number of moles of the monomers b3 present as polymerized units in the polymers A. In these cases, a modification may comprise opening of the cyclic anhydride groups remaining in the reaction, by the addition of saturated alcohols, saturated amines or water. If the polymers A have been reacted with compounds I which contain a primary amine function, it is advantageous thereafter, preferably after removal of the solvent, to add water-binding agents, such as acetic anhydride, to the reaction medium and to keep the mixture at elevated temperatures, preferably from 100° to 140° C., for a few hours. As a rule, the amine function is thus converted into an imide function, which in general increases the cohesion of the novel synthetic resins.

Finally, volatile constituents, such as, for example the solvent, are usually separated off from the novel synthetic resins, preferably under reduced pressure and if necessary at elevated temperatures.

After exposure to ultraviolet radiation (if they contain monomers b1 as polymerized units) or after exposure to electrons, the novel synthetic resins are particularly suitable as contact adhesives which simultaneously have high surface tack, adhesion and cohesion and are particularly suitable for the production of self-adhesive articles (which very generally consist of a substrate material and a contact adhesive), preferably self-adhesive tapes or labels.

Depending on the application, the substrate materials are chosen from various substrates. Suitable materials include textile fabrics, papers, plastic films consisting of polyvinyl chloride, polyesters, such as polyethylene glycol terephthalate, cellulose acetate or polypropylene, metal foils of aluminum, copper or lead, and foams consisting of polyurethane, polyvinyl chloride, polyethylene and polychloroprene.

The novel synthetic resins are preferably applied before exposure to ultraviolet light. Application may be effected from organic solution, preferably having a solids content of from 50 to 80% by weight, or from the melt; where organic solutions of the novel synthetic resins are used, the solvent is expelled after coating of the substrate surface, in general by means of heat. Application may furthermore be effected from an aqueous secondary dispersion. It is preferably carried out from the melt, at from 80° to 120° C. Application may be effected in a conventional manner by brushing on, atomizing, roller coating, knife coating or pouring.

Exposure can be carried out immediately after application, after removal of the solvent (application from solution) or after passage through a heating, thermostated and/or cooling zone (particularly in the case of application from the melt).

For exposure to ultraviolet light, commercial UV lamps which preferably emit in the wavelength range from 200 to 700 nm can be used. For example, medium pressure mercury lamps having a radiant power of from 80 to 120 W/cm, as described in, for example, Sources and Application of Ultraviolet Radiation, R. Philips, Academic Press, London 1983, are suitable. Exposure to ultraviolet light does not require the presence of an inert gas.

Examples of suitable radiation sources for electrons are electron beam generators whose acceleration voltage is advantageously from 150 to 300 kV. The exposure time depends on the thickness of the coating, on the radiation power of the radiation source used and, in the case of UV exposure, on the particular monomers b1 present as polymerized units. However, it can readily be determined in preliminary experiments. It is known that the radiation dose required for achieving the advantageous contact adhesion properties is relatively small, particularly for exposure to electrons. As a rule, it is from 1 to 5 mrad for exposure to electrons. This is particularly advantageous when thick adhesive layers are required (mass applied as dry weight up to 100 g/M$^2$) and very generally permits a high production rate in the abovementioned exposure apparatus. Excessively high radiation doses generally cause degradation of the novel synthetic resins. The novel synthetic resins can be modified in a conventional manner by adding to them tackifiers, such as rosin, coumarone/indene resin, terpene resin, alkylphenol/formaldehyde resin or alkyd resin, in amounts of not more than 50% by weight. Mineral fillers, plasticizers, polychlorinated hydrocarbons or liquid paraffins may also be added in minor amounts. Acetophenone or benzophenone derivatives which are not monoethylenically unsaturated, such as benzophenone, 4-methoxybenzophenone or benzophenone-2-carboxylic acid, may also be stirred in, with the result that novel synthetic resins which do not contain monomers b1 as polymerized units are also suitable as contact adhesives after uv exposure. Such external photoinitiators are preferably stirred in amounts of from 0.01 to 5% by weight, based on the weight of the synthetic resins.

Over and above their use as a basis for contact adhesives, the novel synthetic resins have higher cohesion after exposure to radiation and are therefore suitable in general for the production of coatings and for impregnation, for example in the production of nonwovens, exposure to ultraviolet light or electrons being carried out in this case too, preferably after application. Interestingly, the novel synthetic resins have a completely satisfactory shelf life in the absence of UV radiation or electron beams.

EXAMPLES

Example 1

Preparation of various polymers A

A1: mixture of 200 g of ethyl acetate, 60 g of maleic anhydride, 4 g of 2,2'-azobis-(methyl isobutyrate) and 100 g of a monomer mixture consisting of 500 g of n-butyl acrylate, 310 g of 2-ethylhexyl acrylate, 130 g of methyl acrylate and 6.5 g of the benzophenone compound

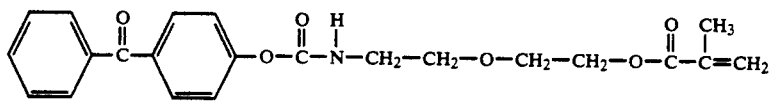

was heated to the polymerization temperature of 80° C. for 10 minutes. Thereafter, the remainder of the monomer mixture and a solution of 10 g of 2,2'-azobis-(methyl isobutyrate) in 100 g of ethyl acetate were added continuously in the course of 4 hours while maintaining the polymerization temperature. The mixture was then kept for a further 4 hours at 80° C., after which the solvent was distilled off at atmospheric pressure and at about 130° C. The K value of the resulting polymer A1 (25° C., THF) was 43.

A2: A mixture of 300 g of ethyl acetate, 3 g of 2,2'-azobis-(methyl isobutyrate), 120 g of a monomer mixture I consisting of 990 g of isoamyl acrylate, 195 g of methyl acrylate and 11.3 g of the benzophenone compound from A1 and 40 g of a monomer mixture II consisting of 60 g of maleic anhydride and 255 g of isoamyl acrylate was heated to the polymerization temperature of 80° C. for 10 minutes. Thereafter, while maintaining the polymerization temperature, the remainder of monomer mixture I was added continuously in the course of 4 hours, the remainder of monomer mixture II was added continuously in the course of 3 hours and a solution of 18 g of 2,2'-azobis-(methyl isobutyrate) in 100 g of ethyl acetate was added continuously in the course of 2 hours. The mixture was then first kept at 80° C. for a further 4 hours, after which the solvent was distilled off under atmospheric pressure and at about 130° C. The K value of the resulting polymer A2 (25° C., THF) was 43.9.

A3: As for A1, except that the monomer mixture consisted of 830 g of isoamyl acrylate, 40 g of maleic anhydride, 130 g of methyl acrylate and 6.5 g of the benzophenone compound

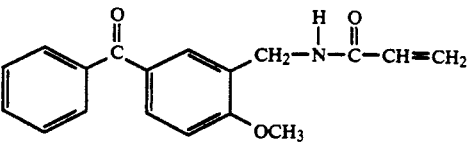

The K value of the resulting polymer A3 (25° C., THF) was 41.7.

A4: A mixture of 400 g of ethyl acetate, 8 g of 2,2'-azobis-(methyl isobutyrate), 160 g of a monomer mixture I consisting of 1320 g of isoamyl acrylate and 260 g of methyl acrylate and 40 g of a monomer mixture II consisting of 80 g of maleic anhydride and 340 g of isoamyl acrylate was heated to the polymerization temperature of 80° C. for 10 minutes. Thereafter, while maintaining the polymerization temperature, the remainder of monomer mixture I was added continuously in the course of 4 hours, the remainder of monomer mixture II was added continuously in the course of 3 hours and a solution of 20 g of 2,2'-azobis-(methyl isobutyrate) in 100 g of ethyl acetate was added continuously in the course of 2 hours. The mixture was then first kept at 80° C. for a further 4 hours, after which the solvent was distilled off at atmospheric pressure and at about 130° C. The K value of the resulting polymer A4 (25° C., THF) was 41.

A5: A mixture of 200 g of toluene, 4 g of 2,2'-azobis-(methyl isobutyrate) and 100 g of a monomer mixture of 500 g of 2-ethylhexyl acrylate, 300 g of n-butyl acrylate, 130 g of methyl acrylate, 20 g of acrylic acid and 6.5 g of the benzophenone compound

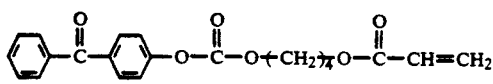

was heated to the polymerization temperature of 80° C. for 10 minutes. Thereafter, while maintaining the polymerization temperature, the remainder of the monomer mixture and a solution of 10 g of 2,2'-azobis-(methyl isobutyrate) in 100 g of toluene were added continuously in the course of 2 hours. The mixture was then first kept at 80° C. for a further 4 hours, after which the solvent was distilled off at atmospheric pressure and at about 130° C. The K value of the resulting polymer A5 (250° C., THF) was 43.

Example 2

Preparation of various novel synthetic resins from polymers A of Example 1

K1: The total amount of A1 prepared in Example 1 was dissolved in 200 g of toluene, and a solution of 23.3 g of allylamine in 200 g of toluene was added continuously in the course of 1 hour at 45° C. Thereafter, the mixture was kept at about 50° C. for a further 4 hours, after which the volatile constituents were removed under reduced pressure. The synthetic resin K1 which exhibited flow at room temperature was obtained.

K2: 60 g of acetic anhydride were added to the total amount of K1 formed and the mixture was kept at 120° C. for 6 hours. The volatile constituents were then removed under reduced pressure.

K3: As for K1, except that A2 was used as the starting material and was reacted with allylamine in an amount of 5.8 g per kg of A2.

K4: As for K3, except that reaction was carried out with 11.7 g of allylamine per kg of A2.

K5: As for K3, except that reaction was carried out with 17.5 g of allylamine per kg of A2.

K6: 8.73 g of allylamine were added to a solution of 1 kg of A5 in 250 g of ethyl acetate at 45° C., after which the mixture was kept at 50° C. for a further 4 hours and the volatile constituents were then removed under reduced pressure. A synthetic resin K6 which exhibited flow at room temperature and had a hydrogenation iodine number of 3.9 g of iodine/100 g of K6 was obtained.

K7: As for K6, except that reaction was carried out with 14.56 g of allylamine. The hydrogenation iodine number was 6.4 g of iodine/100 g of K7.

K8: As for K1, except that 600 g of a polymer A which corresponded to A2, but in contrast to A2 contained no polymerized benzophenone derivative were reacted with 11.7 g of allylamine.

K9: As for K1, except that the total amount of A3 formed in Example 1 was reacted with 17.5 g of allylamine.

Example 3

Testing the contact adhesive properties of various synthetic resins from Example 2, after exposure to ultraviolet light or to electrons a) Production of the test strips For the production of the test strips, the novel synthetic resins K were applied from their melt in a layer thickness of 25 g/m² or of 100 g/M² onto a film of polyethylene glycol terephthalate (Hostaphar ® RN36).

The polyester films were then exposed to ultraviolet light (medium pressure mercury lamp 80 W/cm) or to electrons (electron curtain generator) in different radiation doses. Strips 2 cm wide and 25 cm long were cut from the self-adhesive films thus obtained. Exposure to electrons was carried out in an inert gas, i.e. in the absence of oxygen. The radiation dose for UV exposure was determined using a UVICURE UV CURIN radiometer SIN 0588047 from EIT Electronic Instrumentation und Technologie, Inc. in mJ/cm².

b) Testing the cohesion (shear strength)

The test strips (a) were rolled over a length of 2.5 cm onto a chromium-plated steel sheet (V2A) using a 2.5 kg weight and was stored for 24 hours at 23° C. and 65% relative humidity. The non-bonded end of the steel sheet was then fastened between two clamping jaws and the opposite projecting self-adhesive tape, hanging freely, was loaded with a 2 kg or 1 kg weight at 23° C. or 50° C. The time taken to break the adhesive film is a measure of the shear strength. The results are shown in the Table.

C) Testing the adhesion (peel strength)

To determine the peel strength of the test strips (a) on the surface of a substrate, said strips were rolled over a length of 20 cm onto a chromium plated steel sheet (V2A) using a 2.5 kg weight. Immediately or 24 hours afterward, the force required to peel the test strips backward at a speed of 300 mm/min in a tensile test apparatus at a peeling angle of 180° C. was determined. The results are likewise shown in the Table.

d) Determination of the loop value (surface tack)

To determine the loop value, a test strip was made into a loop and was moved with the coated side toward a test specimen of chromium steel (V2A) at a speed of 300 mm/min until the loop rested on the test surface under its own weight. The loop was then pulled off again at a speed of 300 mm/min. The loop value is the force required for removal. The results are likewise shown in the Table.

TABLE 1

| Synthetic resin | Amount applied [g/m²] | Radiation | Radiation dose mJ·cm⁻²/mrad | Shear strength [h] 2 kg. 23° C. | 1 kg. 50° C. | Peel strength [N/2 cm] Immediate | after 24 h | Loop value [N/2 cm] |
|---|---|---|---|---|---|---|---|---|
| K 1 | 25 | UV | 161 | >24 | >24 | 8.4 | 14 | 8.0 |
| K 1 | 25 | UV | 90 | >24 | >24 | 9.7 | 16 | 7.4 |
| K 9 | 25 | UV | 42 | >18 | >24 | 8.8 | 11.5 | 7.6 |
| K 5 | 100 | UV | 161 | >10 | >5 | 10.5 | 14.2 | 7.5 |
| K 5 | 100 | UV | 61 | >8 | >3 | 11.3 | 16.1 | 8.1 |
| K 8 | 25 | e⁻ | 4 | >24 | >24 | 10.9 | 11.3 | 11.1 |
| K 4 | 25 | e⁻ | 4 | >24 | >24 | 10.1 | 11.2 | 10.5 |
| K 2 | 100 | e⁻ | 2 | 4 | 2 | 15.1 | 14.1 | 11.6 |
| K 2 | 100 | e⁻ | 2.5 | 19 | 5 | 10.8 | 20.3 | 11.0 |
| K 2 | 100 | e⁻ | 3 | >24 | 17 | 9.5 | 14.2 | 9.7 |
| K 2 | 100 | e⁻ | 4 | >48 | >24 | 10.9 | 11.3 | 11.1 |

We claim:

1. A synthetic resin produced by chemically bonding at least one allylamine, N-methylallylamine, diallylamine, N-phenylallylamine, allyl alcohol, or compound having formula I

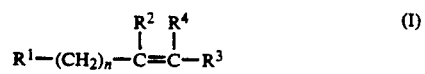

where $R^1$ is —OH, —NH$_2$,

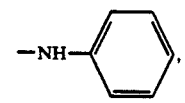

—NHR³ or

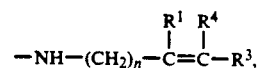

$R^2$ is —H, —CH$_3$ or —C$_2$H$_5$, $R^3$ is —C$_m$H$_{2m+1}$, where m is 1 to 6, $R^4$ is —H or —CH$_3$ and n is 1 to 12, via the oxygen or nitrogen atom to one or more polymers A prepared by polymerizing monomers consisting of a) 50 to 99.95% by weight of one or more esters of acrylic or methacrylic acid with monohydric alcohols of 1 to 18 carbon atoms or a mixture of these esters, b) 0.05 to 5% by weight of one or more monoethylenically unsaturated acetophenone or benzophenone derivatives which do not have a phenyl group containing a free hydroxyl group ortho to the carbonyl group of the phenone skeleton or a mixture of these monomers (monomers b2), and c) 0 to 49.95% by weight of other copolymerizable monomers selected from the group consisting of monoethylenically unsaturated monobasic acids of 3 to 6 carbon atoms, monoethylenically unsaturated dibasic acids of 3 to 6 carbon atoms, monocarboxylic acids, dicarboxylic acids, monoesters of monoethylenically unsaturated dicarboxylic acids with alkanols of 1 to 7 carbon atoms, semiamides of monoethylenically unsaturated dicarboxylic acids with aliphatic amines of 1 to 7 carbon atoms, cyclic anhydrides of monoethylenically unsaturated dicarboxylic acids of 4 to 8 carbon atoms, vinyl esters of aliphatic carboxylic acids of 2 to 18 carbon atoms, vinyl aromatic compounds, unsaturated hydrocarbons, nitrogen-containing monomers, vinyl ethers, halogen-containing monomers, diesters of lower monoethylenically unsaturated carboxylic acids with alkanols of 1 to 10 carbon atoms, or mixture thereof.

2. The synthetic resin as claimed in claim 1, wherein the vinyl esters of aliphatic carboxylic acids of 2 to 18 carbon atoms are selected from the group consisting of vinyl acetate, vinyl propionate, vinyl laurate and vinyl stearate; the vinyl aromatic compounds are selected from the group consisting of styrene, α-methylstyrene and vinyltoluene; the unsaturated hydrocarbons are selected from the group consisting of ethene, cyclohexane, butadiene and isoprene; the nitrogen-containing monomers are selected from the group consisting of acrylamide, N-vinylpyrrolidone and N-vinylcaprolactam; the vinyl ethers are selected from the group consisting of methyl vinyl ether, ethyl vinyl ether, n-butyl vinyl ether, isobutyl vinyl ether, 2-ethylhexyl vinyl ether and 2-methylene-1,3-dioxepan; the halogen containing monomers are selected from the group consisting of vinyl chloride and vinylidene chloride; the diesters of lower monoethylenically unsaturated carboxylic acids with alkanols of 1 to 10 carbon atoms are selected from the group consisting of di-n-butyl fumarate, diethyl maleate, dimethyl fumarate, and esters of acrylic or methacrylic acid with glycidol.

3. The synthetic resin as claimed in claim 1, whose one or more polymers A consist of a) from 50 to 99.85% by weight of one or more monomers a, b) from 0.05 to 5% by weight of one or more monomers b1, c) from 0.1 to 10% by weight of one or more monomers b3 and d) from 0 to 49.85% by weight of other copolymerizable monomers in polymerized form.

4. The synthetic resin as claimed in claim 1, whose one or more polymers A consist of a) from 50 to 98.75% by weight of one or more monomers a, b) from 0.25 to 2% by weight of one or more monomers b1, c) from 1 to 5% by weight of one or more monomers b3 and d) from 0 to 49.75% by weight of other copolymerizable monomers in polymerized form and are chemically bonded to one or more compounds I via the oxygen or nitrogen atom of their radical $R^1$ in amounts such that the number of moles of the chemically bonded compounds I is not less than one tenth of the number of moles of the polymerized monomers b3 and the number of moles of double bonds per kg of polymer A is from 0.01 to 0.5.

5. The synthetic resin as claimed in claim 1 whose one or more polymers A are chemically bonded to one or more compounds I whose radical $R^1$ is an amine.

6. The synthetic resin as claimed in claim 1, whose one or more polymers A is bonded to allylamine as one or more compounds I.

7. The synthetic resin as claimed in claim 1, whose one or more polymers A contain one or more of the monomers

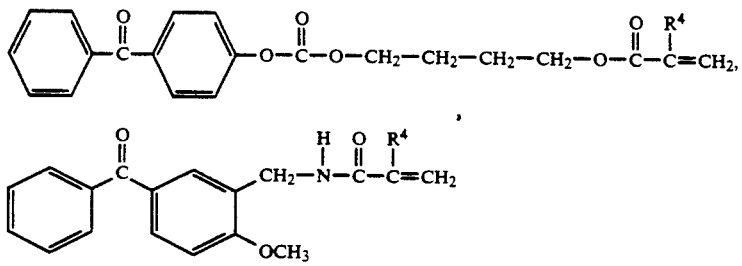

where $R^4$ is —H or —$CH_3$, as polymerized units.

8. The synthetic resin as claimed in claim 1, whose one or more polymers A have a K value of from 30 to 50 at 25° C. in tetrahydrofuran.

9. The synthetic resin as claimed in claim 1, whose one or more polymers A have a glass transition temperature of from −30° to −10° C.

10. The process for the preparation of a synthetic resin as claimed in claim 1, wherein the one or more polymers A are prepared in a first stage by free radical polymerization of the monomers a and b and said polymers are then reacted with the compounds I.

11. The synthetic resin as claimed in claim 1, obtained by binding one or more compounds I whose radical $R^1$ is a primary amine function to the one or more polymers A and then converting this amine function into an imide function.

12. A self-adhesive article which consists of a substrate and a contact adhesive comprising a synthetic resin as claimed in claim 1.

13. A method of using a synthetic resin as claimed in claim 1 as a basis for contact adhesives comprising applying the synthetic resin to a substrate and irradiating the synthetic resin to cure the resin on the substrate.

* * * * *